Figure 1:
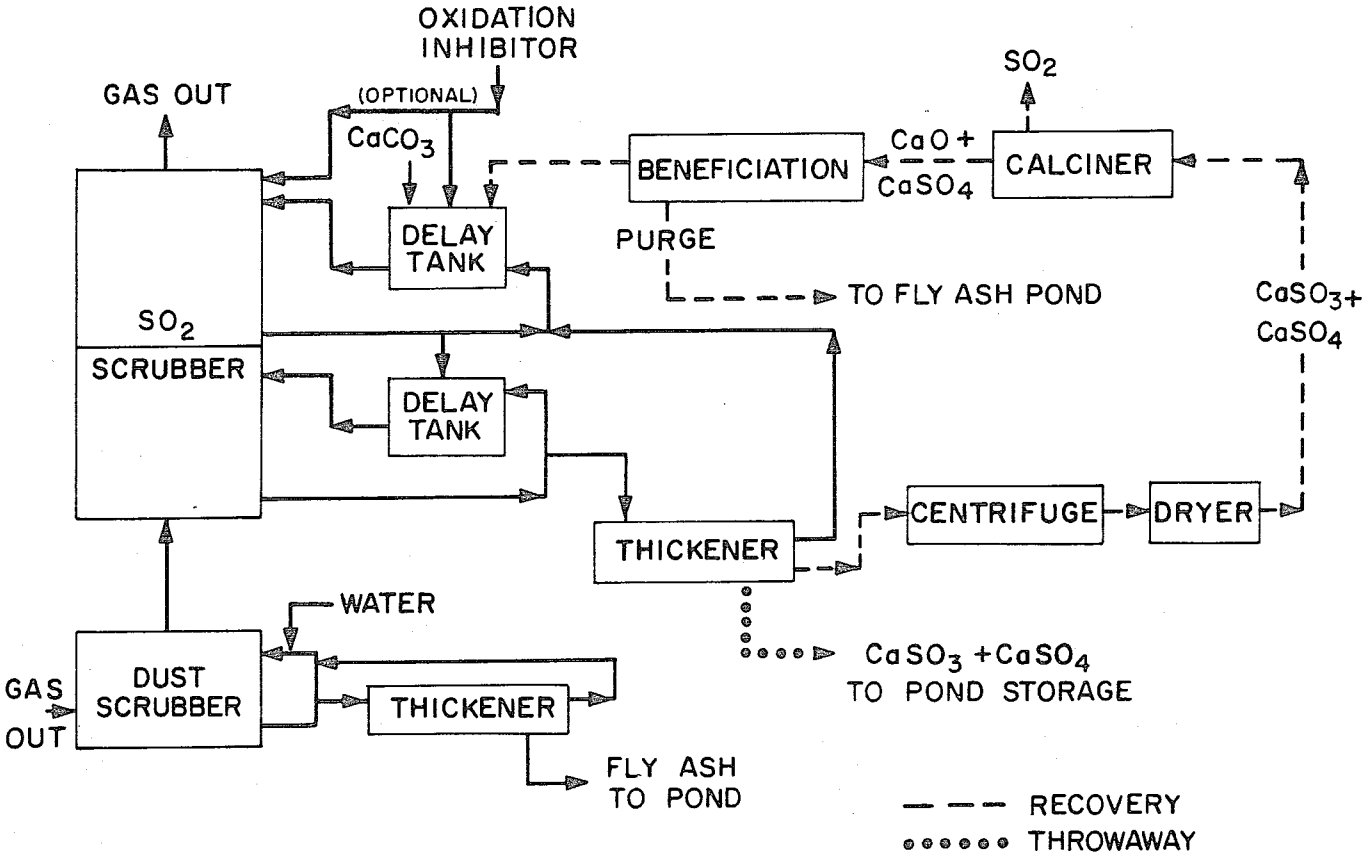
Figure 2:
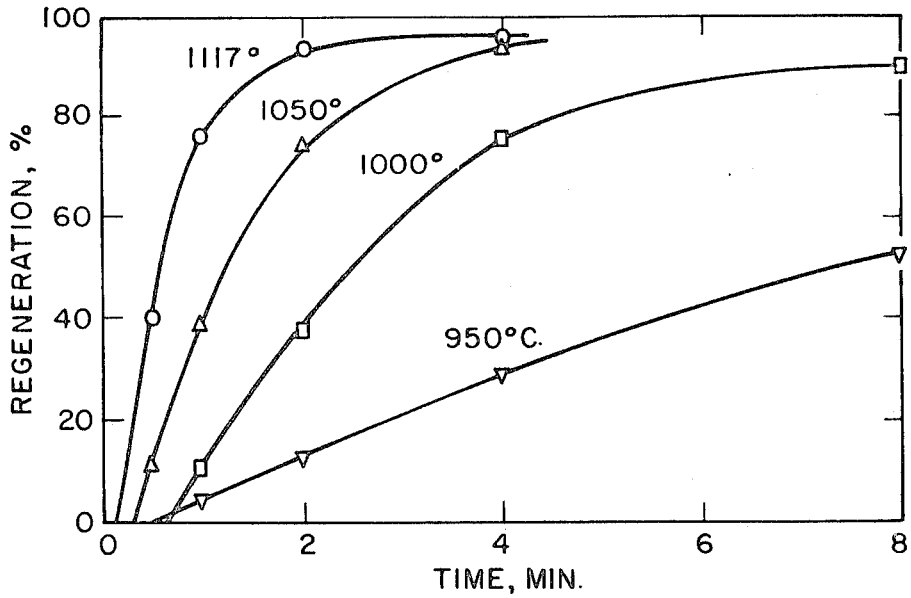

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 981

T890,008

SULFUR DIOXIDE RECOVERY FROM STACK GASES EMPLOYING OXIDATION INHIBITOR

Archie V. Slack, Wilson Lake Shores, Sheffield, Ala. 35660, and John M. Potts, 1010 Linwood Ave., Florence, Ala. 35630

Filed Oct. 7, 1970, Ser. No. 78,662
Int. Cl. B01d *47/00, 47/02*
U.S. Cl. 23—2SQ
2 Sheets Drawing. 16 Pages Specification

An improved process for scrubbing power plant stack gas with lime or limestone slurries to remove sulfur oxides which consists of feeding lime or limestone along with recycle liquor and makeup water to a delay tank; circulating the slurry formed through a gas scrubber to remove sulfur dioxide from stack gas; advancing slurry equivalent to that made in the above delay tank countercurrent to the gas and using it in another scrubbing stage or stages; removing a similar amount of slurry from this scrubbing stage and separating solids and calcining them to produce usable sulfur dioxide; returning separated liquor to scrubbing circuit; and reusing calcined solids in scrubbing circuit for removal of sulfur dioxide. Oxidation inhibitor is added to keep the sulfur in easily regenerable calcium sulfite form. The calcium sulfite is heated to drive off sulfur dioxide for sulfuric acid manufacture and simultaneously regenerate lime for reuse in scrubbing stack gas. Unwanted calcium sulfate unavoidably formed is coarser than calcium sulfite or regenerated lime and is separated by size classification and discarded. Fly ash, if present, can be removed ahead of the sulfur dioxide scrubbers by wet scrubbers or electrostatic precipitators.

SULFUR OXIDE SCRUBBING SYSTEM SUITABLE FOR EITHER RECOVERY OR THROWAWAY OPERATION

Archie V. Slack
John M. Potts
INVENTORS.

BY Robert A. Petrunka
Agent

EFFECT OF TIME AND TEMPERATURE ON REGENERATION OF $CaSO_3$

Archie V. Slack
John M. Potts INVENTORS.

BY Robert A. Petrusek
Agent